United States Patent
Davis

(10) Patent No.: US 6,932,564 B2
(45) Date of Patent: Aug. 23, 2005

(54) HETEROSCOPIC TURBINE

(75) Inventor: Scott Davis, Foothill Ranch, CA (US)

(73) Assignee: Forced Physics Corporation, Foothill Ranch, CA (US)

( * ) Notice: Subject to any disclaimer, the term of this patent is extended or adjusted under 35 U.S.C. 154(b) by 0 days.

(21) Appl. No.: 10/693,635

(22) Filed: Oct. 24, 2003

(65) Prior Publication Data

US 2005/0002776 A1 Jan. 6, 2005

Related U.S. Application Data

(60) Provisional application No. 60/499,066, filed on Aug. 29, 2003, and provisional application No. 60/434,852, filed on Dec. 19, 2002.

(51) Int. Cl.$^7$ .................................................. F03B 5/00
(52) U.S. Cl. ......................... 415/90; 416/4; 416/231 R
(58) Field of Search ............................. 415/90; 416/1, 416/4, 231 R; 137/10; 138/44

(56) References Cited

U.S. PATENT DOCUMENTS 5,871,336 A * 2/1999 Young ........................ 417/207
5,932,940 A * 8/1999 Epstein et al. ........ 310/40 MM
6,533,554 B1 * 3/2003 Vargo et al. ................ 417/207
2004/0179946 A1 * 9/2004 Gianchandani et al. ..... 417/207

FOREIGN PATENT DOCUMENTS

WO   WO 2004/059147 A2   7/2004

* cited by examiner

*Primary Examiner*—Edward K. Look
*Assistant Examiner*—Dwayne J. White
(74) *Attorney, Agent, or Firm*—Swernofsky Law Group PC

(57) ABSTRACT

A heteroscopic turbine with a Knudsen number of less than ten. In one embodiment, the heteroscopic turbine generates a flow from a gas. The turbine includes at least a moving surface and a plurality of turbine blades on or in said surface. Each of the blades has a height comparable to a mean free path distance that characterizes molecules in the gas, and the blades are spaced apart by a distance comparable to the mean free path distance. In operation, the surface moves such that the turbine blades pass through the gas at a speed comparable to the mean thermal velocity. In different embodiments, the turbine can perform filtering of molecules in the gas based on direction and/or speed (velocity). Also, techniques by which such a turbine operates.

30 Claims, 17 Drawing Sheets

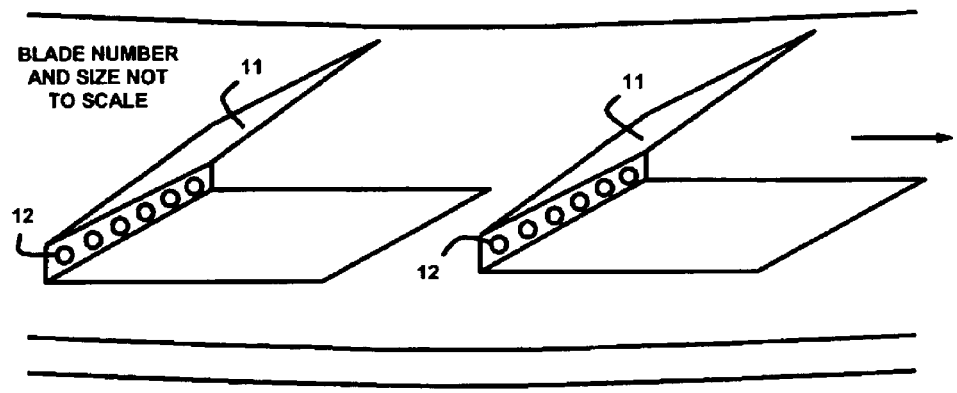
Fig. 6
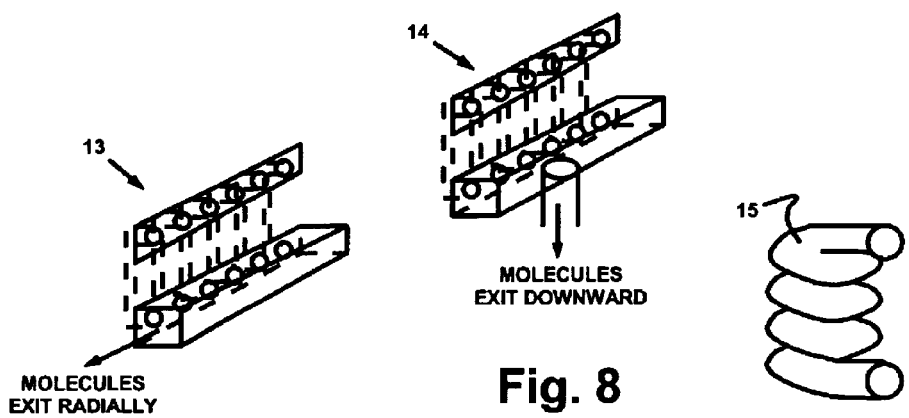
Fig. 7  Fig. 8  Fig. 9

(RADIAL VIEW)

(RADIAL VIEW)

(RADIAL VIEW)

(RADIAL VIEW)

(RADIAL VIEW)

(TANGENTIAL VIEW)

(RADIAL VIEW)

(RADIAL VIEW)

(TANGENTIAL VIEW)

(RADIAL VIEW)

(TANGENTIAL VIEW)

(TANGENTIAL VIEW)

(RADIAL VIEW)

(RADIAL VIEW)

(RADIAL VIEW)

HETEROSCOPIC TURBINE

CROSS REFERENCE TO RELATED PROVISIONAL APPLICATIONS

This application claims priority from Provisional Application No. 60/434,852, "Air Flow, Heat Exchange, and Molecular Selection Systems," filed Dec. 19, 2002, in the name of inventors Scott Davis and Art Williams, and from Provisional Application No. 60/499,066, "Molecular Speed Selection, Flow Generation, Adiabatic Cooling, and Other Heteroscopic Technologies," filed Aug. 29, 2003, in the name of inventors Scott Davis and Art Williams. These provisional applications are incorporated by reference as if fully set forth herein.

BACKGROUND OF THE INVENTION

1. Field of the Invention

This invention relates to a heteroscopic turbine, which is a turbine that uses microscopic or nanoscopic principles to generate macroscopic effects; more specifically, the invention relates to a heteroscopic turbine with a Knudsen number around 1.

2. Description of the Related Art

Molecules in air (and other gaseous matter) are in constant motion, continuously colliding with each other. This molecular motion is constantly occurring, even if the bulk velocity of the air is zero.

The speed of the molecules between collisions is the mean thermal velocity for the air. The average distance between collisions is the mean free path distance. The overall bulk velocity of the air is the air's transport velocity. Theoretically, the maximum transport velocity that can be imparted to an airflow is the mean thermal velocity of the underlying air molecules.

Several conventional apparatuses exist for generating a flow of air. Examples include fans and turbomolecular pumps.

Fans force air to flow in bulk with rotating fan blades. Even highly efficient fans cannot achieve very high transport velocities compared to the underlying molecular motion of the air. In particular, even good fans can only achieve transport velocities that are on the order of a hundredth to a thousandth of the mean thermal velocity of the air molecules.

Because high-velocity (i.e., comparable to mean thermal velocity) bulk air flow cannot be achieved with conventional fans, larger fans must be used to move significant amounts of air. As a result, fan size often becomes a limiting design factor for anything that requires airflow, cooling, or the like.

Another device for moving air (and other gaseous matter) is the turbomolecular pump. Turbomolecular pumps can be used as absorbers or consumers of air molecules. These pumps typically are used to draw molecules from a high vacuum environment in order to create an even "higher" vacuum.

Turbomolecular pumps use rotating turbine blades to select molecules from air. Molecules that randomly cross the tops of the blades are captured and whisked away.

In order for existing turbomolecular pumps to operate, collisions between air molecules must be avoided. If such collisions occur, the molecules can bounce away from the blades before they can be captured, defeating the operation of the pump.

Typical existing turbomolecular pumps use macroscopic turbine blades rotating at extremely high speeds, for example 75,000 RPM. These high speeds are used so that molecules that cross the path of the rotor blades do not have time to collide with other molecules before being whisked away.

Collisions are also prevented by ensuring that the mean free path distance for the molecules is not too small compared to the container or feed tube for the pump. The ratio between container or feed tube length and mean free path distance is the Knudsen number.

Typical existing turbomolecular pumps only operate effectively if the Knudsen number is no greater than approximately 10. This Knudsen number can only be achieved in a high vacuum, and then with only relatively small containers or feed tubes. Obviously, a significant air flow cannot be generated by pumping from a high vacuum through a small container or feed tube. As a consequence, existing turbomolecular pumps do not generate significant air flow.

All of these problems also exist when generating a flow from any other gas or gas mixture besides air.

SUMMARY OF THE INVENTION

What is needed is a device or technique for selecting molecules from air or other gaseous matter and creating a high-velocity bulk flow from the selected molecules. This device or technique should be able to function in pressures greater than a high vacuum and within a container or fed by a tube of significant size.

Accordingly, one aspect of the invention is a heteroscopic turbine with a Knudsen number of less than 10. Such a turbine can function in pressures greater than a high vacuum to generate high-velocity bulk flows.

One embodiment of the turbine includes at least a moving surface and a plurality of turbine blades on or in said surface. Each of the blades has a height comparable to a mean free path distance that characterizes molecules in the gas, and the blades are spaced apart by a distance comparable to the mean free path distance. In operation, the surface moves such that the turbine blades pass through the gas at a speed comparable to the mean thermal velocity of molecules in the gas.

The moving surface can be a disk that spins such that the blades move at a speed comparable to a mean thermal velocity of molecules in the gas. The blades can be arranged on chips that are attached in or on the disk, or can be attached directly in or on the disk.

Preferably, when the turbine spins, tops of the blades form a direction selection plane that filters molecules moving toward the disk and generates a flow from the molecules. In some embodiment, the flow creates forced convection in a direction of the flow, thereby transferring heat in a direction of the flow.

The blades can be formed by edges of holes in the surface. Alternatively, the blades can be angled planes projecting from the surface with openings for molecules to pass at angles formed between the planes and the surface. The turbine can include ducting to transport molecules that have been selected by the blades.

The turbine also can sort molecules based on their relative velocities, which correspond to hotter or cooler temperatures. Such a turbine is called a "speed sorting turbine" herein.

One embodiment of a speed sorting turbine includes the blades that have at least two different heights. When the turbine spins, tops of the blades having a first height form a direction selection plane that filters molecules moving toward the disk, and tops of blades having a second height form a speed selection plane that filters molecules based on mean thermal velocity.

Another embodiment of a speed sorting turbine includes blades that are stacked in layers. A top one of the layers preferentially captures cooler molecules, and a bottom one of the layers preferentially captures hotter molecules.

Yet another embodiment of a speed sorting turbine includes blades that are angled planes projecting from the surface. The blades include openings for cooler molecules to pass at angles formed between the planes and the surface, and opening for hotter molecules to pass through the surface.

In various embodiments of the speed sorting turbines, ducting can be included to transport the hotter molecules, the cooler molecules, or both the hotter and the cooler molecules. Also, additional surfaces can be added that reflect the hotter molecules or the cooler molecules away from the turbine.

In a speed sorting turbine, hotter molecules that move laterally across the blades can pass into areas that are supposed to sort out cooler molecules. In order to help limit this type of action, baffles can be situated between rows of blades. Alternatively, the blades can be curved in a direction of motion through the gas.

Another embodiment of the turbine includes at least a moving surface and a plurality of turbine blades on or in said surface. Each of the blades has a height comparable to a mean free path distance that characterizes molecules in the gas, and the blades are spaced apart by a distance comparable to the mean free path distance. In this embodiment, the moving surface is a rotor that rotates between two stators. The rotor preferably flies over at least one of the stators due to Eckman flow, magnetic levitation, or both.

Preferably, one of the two stators includes barriers positioned such that hotter molecules pass through the rotor to one side of the barrier and cooler molecules pass through the rotor to another side of the barrier. Alternatively, the stator can include barriers arranged in pairs, with each pair arranged such that hotter molecules pass through the rotor to outside of the pair of barriers and cooler molecules pass through the rotor to between the pair of barriers.

The invention also encompasses techniques by which such turbines operate.

This brief summary has been provided so that the nature of the invention may be understood quickly. A more complete understanding of the invention may be obtained by reference to the following description of the preferred embodiments thereof in connection with the attached drawings.

BRIEF DESCRIPTION OF THE DRAWINGS

FIG. 6 shows another possible arrangement of blades for a heteroscopic turbine.

FIGS. 7 to 9 show possible ducting arrangements for heteroscopic turbines.

FIGS. 10A to 10C are referred to collectively as FIG. 10.

FIGS. 11A and 11B are referred to collectively as FIG. 11.

FIGS. 22A to 22D are referred to collectively as FIG. 22.

FIGS. 24A to 24C are referred to collectively as FIG. 24.

DESCRIPTION OF THE PREFERRED EMBODIMENT

Lexicography

Figure 1:
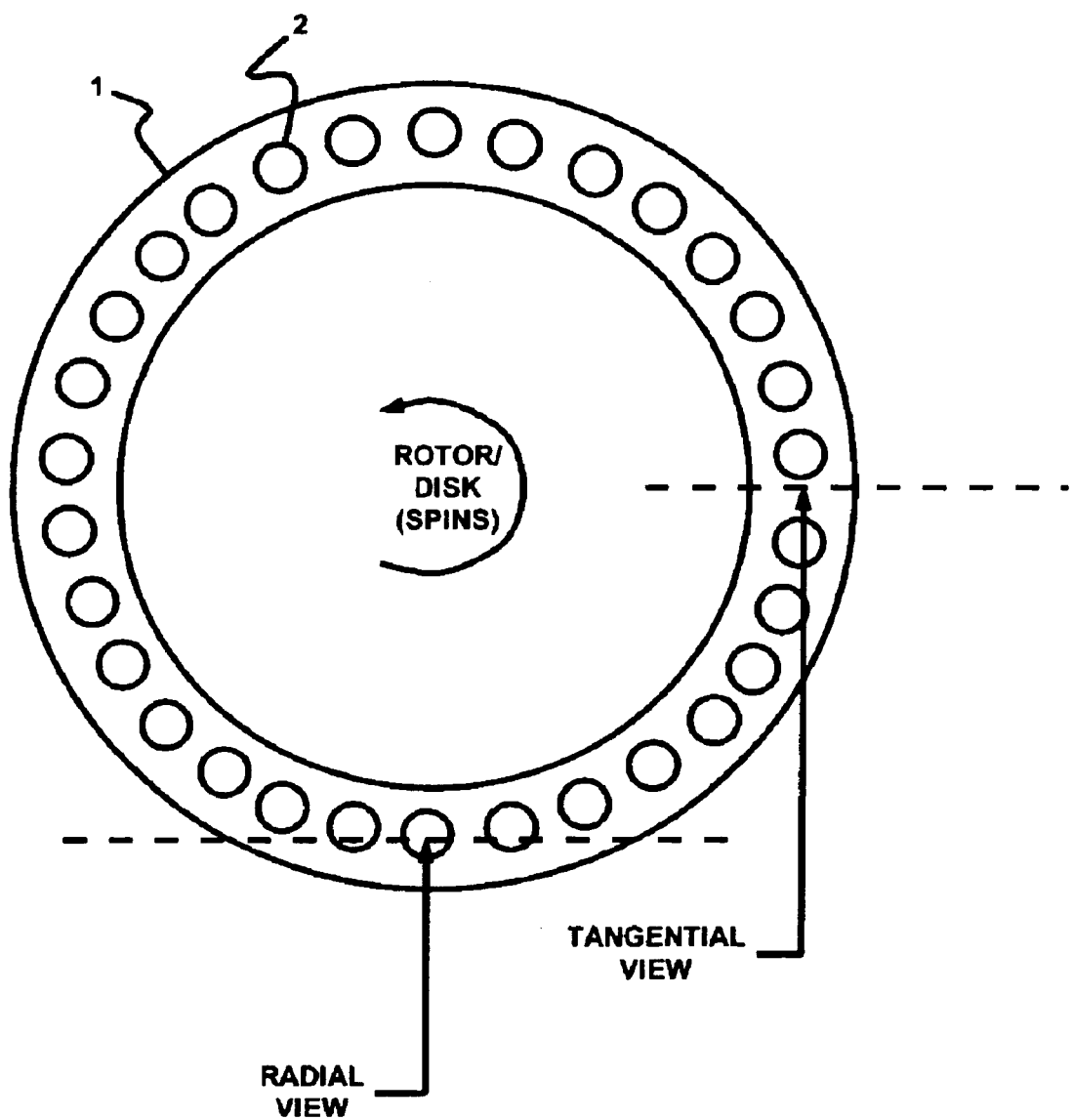
FIGS. 1 and 2 show heteroscopic turbines.

Heteroscopic: Characterized by use of microscopic or nanoscopic principles to generate macroscopic effects.

Microscopic: Having lengths or dimensions less than or equal to one millimeter.

Nanoscopic: Having lengths or dimensions less than or equal to a billionth of a meter.

Macroscopic: Having lengths or dimensions greater than or equal to one millimeter, and numbers greater than about one hundred.

Transport speed: The mean speed of an flow of gaseous matter moving in bulk. Also called bulk speed.

Mean thermal velocity: The speed of molecules in gaseous matter.

Mean free path distance: The average distance that molecules in gaseous matter travel between collisions with other molecules in the gaseous matter.

Hotter molecules: In reference to a given gas, hotter molecules consist of an aggregation of molecules selected from the gas that have a mean thermal velocity faster than the mean thermal velocity of the gas. In reference to individual molecules, a so-called hotter molecule is expected, on average, to be faster and therefore hotter than a so-called cooler molecule, but exceptions can occur.

Cooler molecules: In reference to a given gas, cooler molecules consist of an aggregation of molecules selected from the gas that have a mean thermal velocity slower than the mean thermal velocity of the gas. In reference to individual molecules, a so-called cooler molecule is expected, on average, to be slower and therefore cooler than a so-called hotter molecule, but exceptions can occur.

Near vacuum conditions: Pressures less than or equal to 0.001 atmospheres.

Knudsen number: A ratio of pump container or feed tube size to mean free path distance. (Sometimes in scientific literature, the Knudsen number is expressed as the opposite ratio.)

Turbine blade: Broadly, any edge that is moved through air. This term encompasses both flat blades and tops of holes in a moving surface.

Comparable: In this application, speeds and distances are comparable if they are within an order of magnitude of each other. For example, if air molecules have a mean thermal velocity of 500 meters per second, turbine blades moving at 50 to 5,000 meters per second would be moving at speeds comparable to the mean thermal velocity of the air molecules. Throughout this disclosure, the term "on an order of" is synonymous to "comparable to."

Heteroscopic Devices

The devices according to the invention operate on two different scales. First, the devices segregate molecules from a gas on a microscopic or nanoscopic scale. In particular, the structures that select the molecules have dimensions comparable with the mean free path distance of the molecules in the gas. In normal operating conditions, for example regular atmospheric pressure, these dimensions are somewhere between microscopic and nanoscopic. The invention is not limited to such operating conditions.

Second, the devices generate macroscopic effects. For example, the segregated molecules converge or are directed to generate a bulk flow. The bulk flow can be created from the segregated molecules by the arrangement of the segregating structures, by use of macroscopic structures such as flow ducts, by some combination of these arrangements, or by some other structures or techniques.

The preferred embodiment of the heteroscopic turbine operates with a Knudsen number of between one half and two (i.e., near unity). Thus, the heteroscopic turbine preferably has blades that are about a mean free path distance high and that are spaced apart by about the mean free path distance. The mean free path distance is for a gas at a pressure at which the turbine is intended to operate. According to the invention this gas and pressure can be, but is not limited to, air at normal atmospheric pressure.

In more efficient embodiments of the invention, the microscopic or nanoscopic structures do little or no actual work while segregating molecules based on their speeds. Instead, molecules on an input side moving within a particular range of speeds and directions can pass through the structures, while other molecules collide with the structures or are otherwise repelled.

On an output side, a bulk flow generated by the aggregation of the selected molecules serves to push other ambient molecules out of the way. In systems that do not generate such bulk flows, "infidel" molecules entering from the output side can force the systems to do significant extra work. In the invention, the momentum of molecules comprising the bulk flow pushes would-be infidels away from the output side, thereby helping to prevent those molecules from colliding with the structures and forcing them to do work.

The combination of microscopic or nanoscopic selection with aggregation into a macroscopic bulk flow can lead to extremely high efficiency. This efficiency arises in part from a lack of a velocity boundary layer at an interface between a gas and the turbine blades. This leads to lower viscous losses. The invention is not limited to embodiments that lack such a boundary layer, although the preferred embodiment does lack the boundary layer.

Until recently, the combination of a large number of microscopic and smaller segregating structures has been limited to fields that deal with electricity, light, or other energy. One example of such heteroscopic devices is a computer chip.

In sum, the heteroscopic nature of the invention enables high efficiency without creating significant barriers to production. Such efficiency should have important ramifications for applications such as generating bulk flows, including for example applications where fans and jets are used, and heating and cooling other devices and elements. The invention is not limited to these applications—other applications exist.

Open Rotor Embodiments

Figure 2:
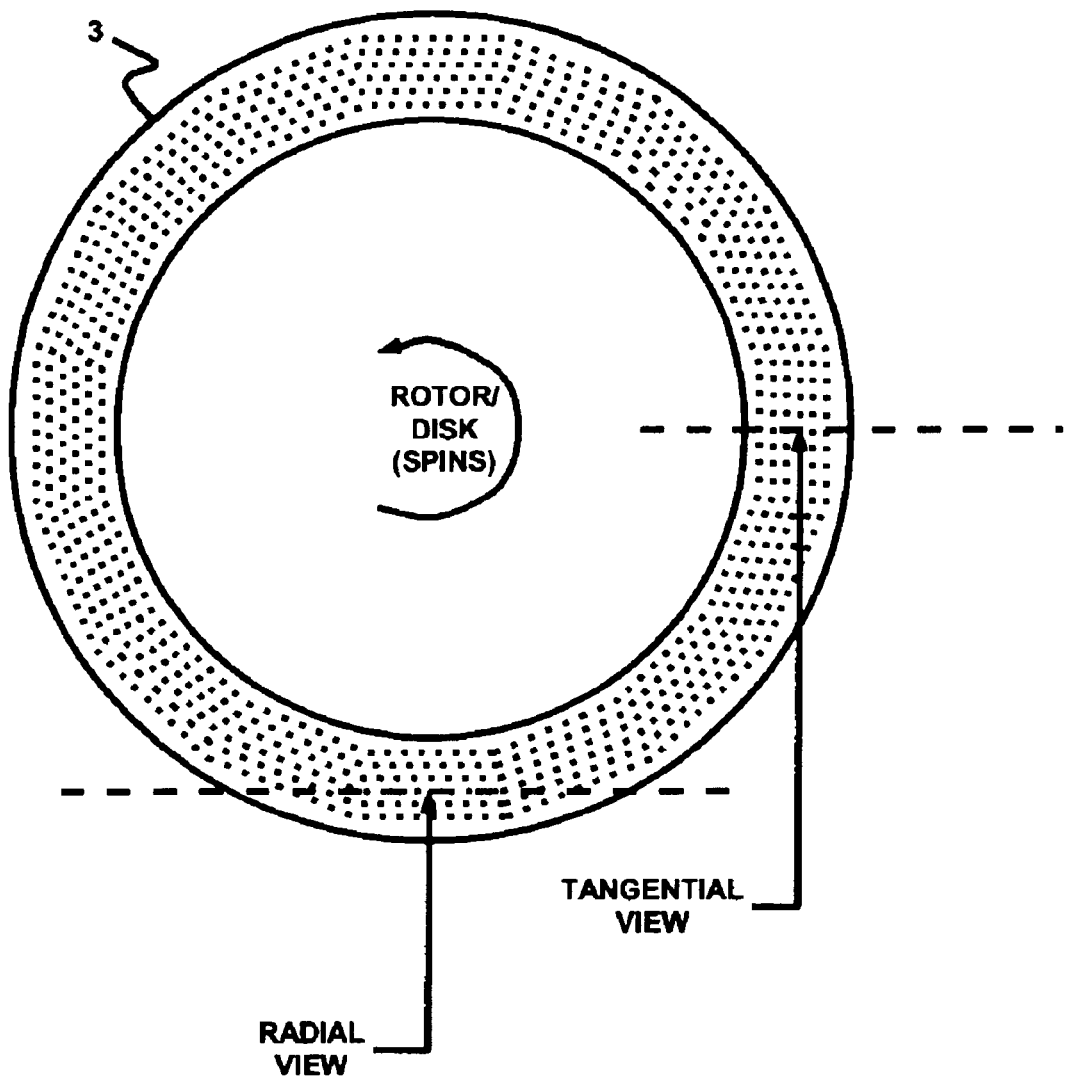

FIGS. 1 and 2 show heteroscopic turbines. In these figures, the turbines spin about an axis extending out of the figures.

In FIG. 1, rotor 1 in a shape of a disk or annulus contains chips 2. The chips contain the microscopic or nanoscopic turbine blades.

The rotor can include ports or ducts (not shown) below each chip 2 to permit airflow from the chips to pass through the rotor. Ports or ducts also can extend radially for speed sorting embodiments (see below).

The Knudsen number for the turbine in FIG. 1 preferably is between one half and two. Each of the blades has a height comparable to the mean free path distance for the gas in which the turbine operates, and the blades spaced apart by a distance comparable to the mean free path distance. In operation, the rotor preferably rotates fast enough so that the blades move through the surrounding gas at a speed comparable to the mean thermal velocity of the gas.

For example, in air at normal atmospheric conditions, the mean free path distance is 6.91E–08 meters. In one embodiment, the gap between turbine blades is 3.455E–08 meters, and the height of the blades is also 3.455E–08 meters. In this embodiment, if the annulus has a circumference of 4 meters, then in operation it would preferably rotate at 7,500 RPM. Somewhere on the order of 1.75E+13 such blades could easily by placed on the annulus shown in FIG. 1, resulting in significant aggregate flow from the turbine blades. The invention is not limited to these particular numeric values, which are only provided as an example of a preferred embodiment.

The arrangement in FIG. 1 permits the blades to be fabricated on the chips, for example using technology developed for computer chip manufacturing. Then, the chips can be attached to the rotor. One benefit of this arrangement is that a manufacturing defect in one chip only ruins that chip, not the entire turbine. This can greatly reduce manufacturing costs.

FIG. 2 shows another embodiment of the heteroscopic turbine. In this embodiment, the blades are attached directly in or on the rotor 3. The locations of turbine blades are represented by the dashes around the periphery of the rotor or disk. The advantage of this arrangement is that far more blades might be attached or manufactured into the turbine.

In both FIGS. 1 and 2, the turbine blades preferably are arranged on the outer portion of the rotor or disk to take advantage of higher linear velocities that occur there as compared to nearer the axis of the rotor or disk. Other arrangements can be used, including ports or other input structures placed over the entire surface of the rotor or disk.

FIGS. 1 and 2 define conventions for "radial view" and "tangential view" used throughout this disclosure. Namely, a "radial view" is a view, possibly a cross-section, along a radius of the rotor or disk. A "tangential view" is a view, possibly a cross-section, parallel to a tangent to the rotor or disk.

Figure 3:
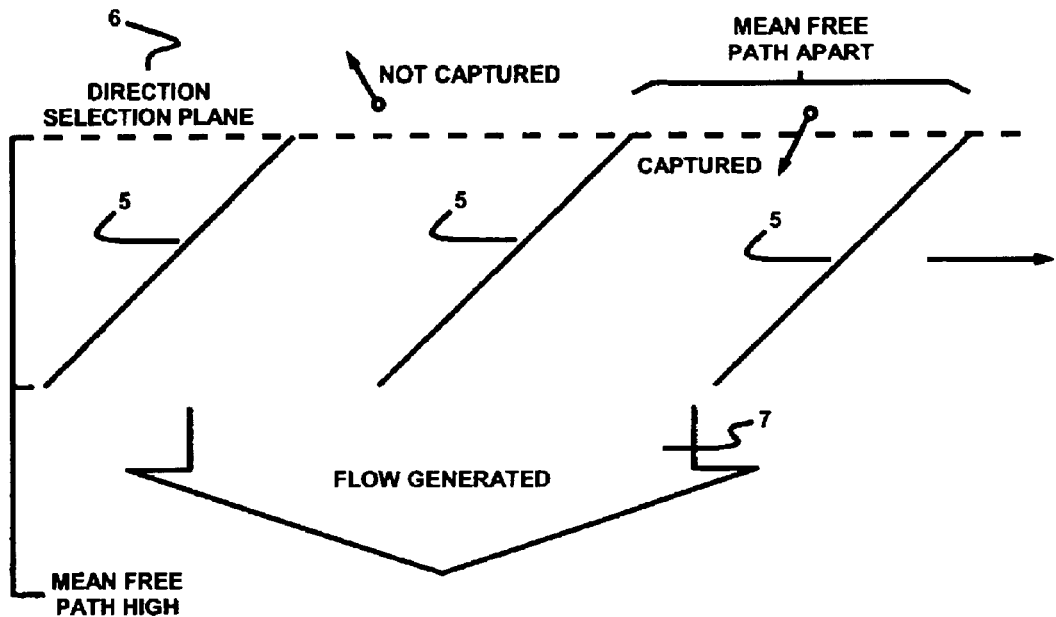
FIG. 3 shows one possible arrangement of blades for a heteroscopic turbine.

FIG. 3 shows one possible arrangement of blades for a heteroscopic turbine. The number and arrangement of blades in FIG. 3, as well as throughout the rest of this application, are not to scale.

The blades in FIG. 3 could be mounted on the chips or rotors shown in FIGS. 1 and 2 or on some other structure that moves through a gas, either rotationally or translationally. FIG. 3 is a radial view, and the rotor surface is moving from left to right.

In FIG. 3, blades 5 are of approximately equal height. The blades are on an order of a mean free path distance high and are on an order of a mean free path distance apart. The Knudsen number for these blades preferably is near unity.

When the blades move through a gas at a speed comparable to the mean thermal velocity of the gas, molecules that move past the tops of the blades are captured. Molecules moving away from the tops are not captured. Thus, the tops of the blades form direction selection plane 6.

Molecules captured by blades 5 either pass through the blades untouched or are pushed by the blades to below the blades. The aggregation of these molecules generates bulk flow 7.

While the flow generated by each blade is small, the aggregation of all of the flows can be very significant. In fact, depending on the particular embodiment, the bulk flow can be much stronger than would be generated by a similar sized conventional fan or turbine. In theory, the flow can even be strong enough to provide jet propulsion for a vehicle from even a relatively small heteroscopic turbine.

The momentum of molecules comprising the bulk flow pushes would-be infidels away from the output side of the blades (i.e., bottoms in FIG. 3), thereby helping to prevent those molecules from colliding with the structures and forcing them to do (more) work.

Figure 4:
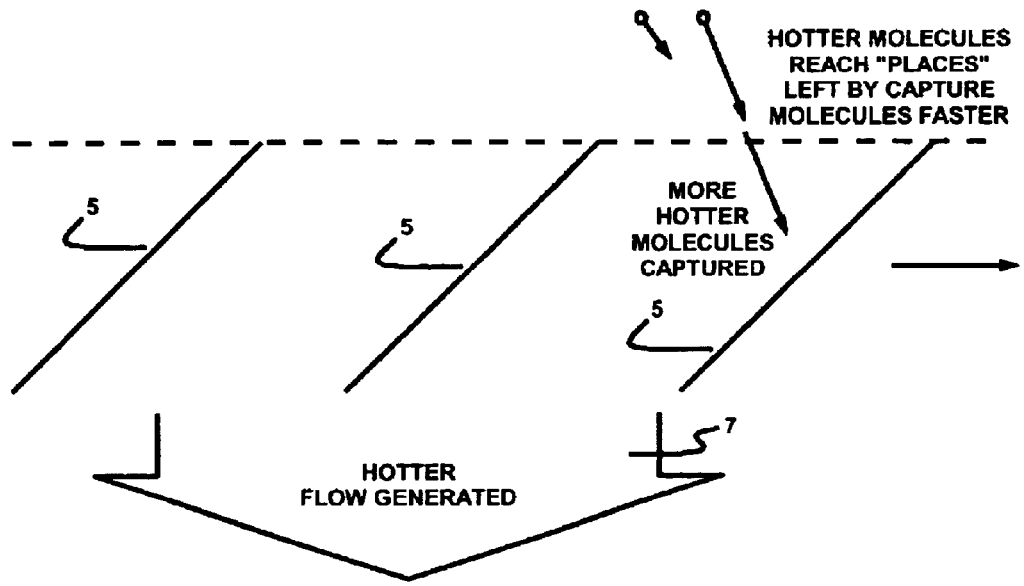
FIG. 4 shows forced convection in a heteroscopic turbine.

FIG. 4 shows forced convection in a heteroscopic turbine. As molecules are captured from the top side of blades 5, other molecules move via Brownian motion to take their place. Hotter molecules are faster and therefore more likely to take the place of captured molecules. As a result, more hotter molecules tend to be captured, resulting in flow 7 including a disproportionate number of hotter molecules (i.e., a hotter flow is generated). This process is called "forced convection" and may have many useful applications, for example cooling gas above the turbine or warming gas below the turbine.

Figure 5:
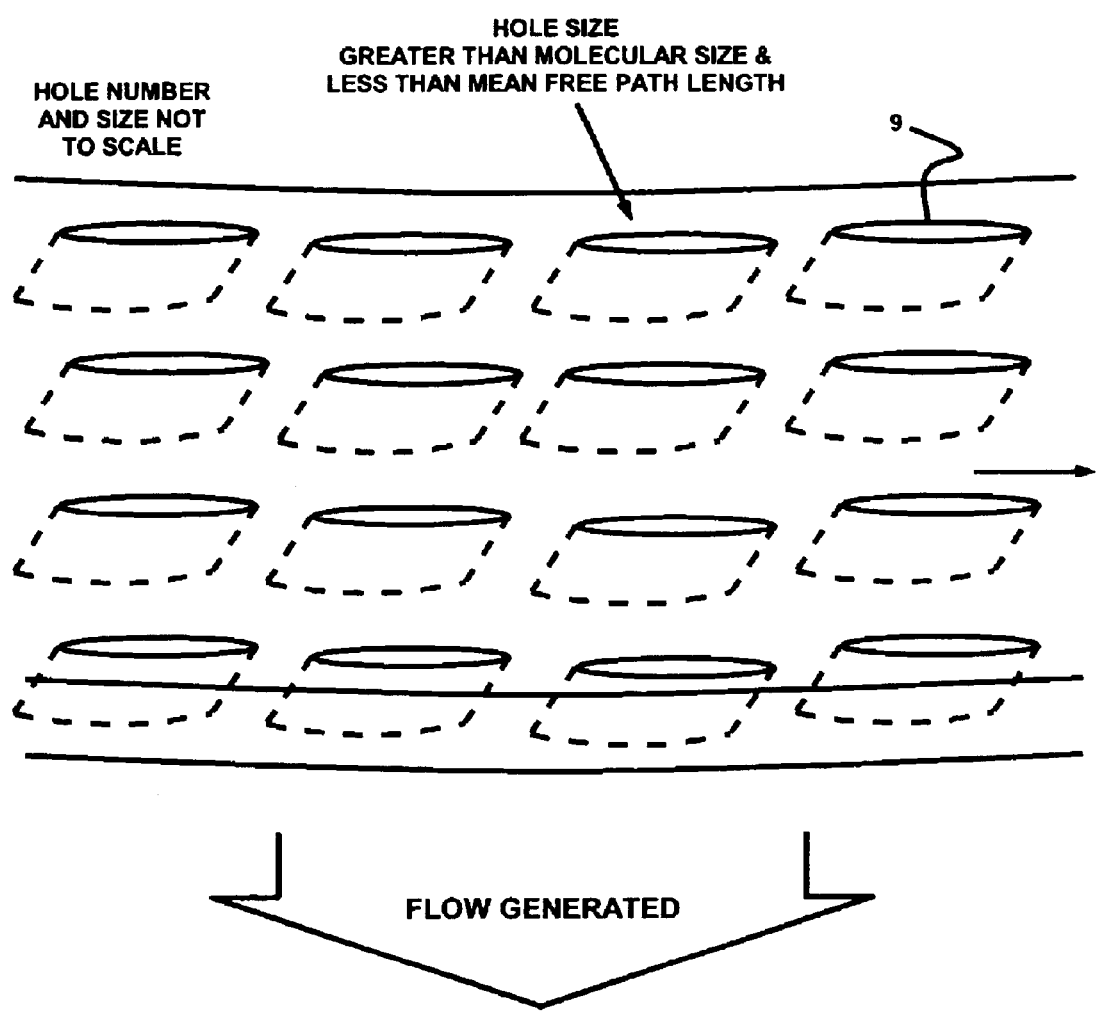
FIG. 5 shows blades formed from holes in a surface of a heteroscopic turbine.

FIG. 5 shows blades formed from holes in a surface of a heteroscopic turbine. These holes could be in the chips or rotors shown in FIGS. 1 and 2 or on some other structure that moves through a gas, either rotationally or translationally. FIG. 5 is a radial view, and the rotor surface is moving from left to right.

The edges and sides of holes 9 in FIG. 5 form turbine blades. In a preferred embodiment, the size of holes 9 is greater than a molecular size for the gas in which the heteroscopic turbine operates and less than a mean free path distance for that gas.

The holes in FIG. 9 can be bored using any of a great number of existing technologies, including but not limited to e-beam and photographic lithography, sputtering, laser drilling, mechanical drilling, ion beam drilling, chemical etching, and other technologies.

FIG. 6 shows another possible arrangement of blades for a heteroscopic turbine. Blades 11 in this embodiment are formed from angled planes projecting from the surface of the rotor (or other structure). Molecules captured by blades 11 exit through openings 12 at angles formed between the planes and the surface.

FIGS. 7 to 9 show possible ducting arrangements for heteroscopic turbines. FIG. 7 has ducts 13 that collect captured molecules for radially exit from a turbine. FIG. 8 has ducts 14 that collect captured molecules for axial (downward) exit from a turbine. Other ducting arrangements are possible, some of which are shown in other figures in this disclosure.

FIG. 9 shows a twisted of curved duct that can be used with some of the ducting arrangements. This duct forces molecules that pass through it to collide with the walls of the duct. The result can be to slow the molecules down, thereby cooling them. Molecules can even be slowed down by one or more collisions with the blades.

Speed Sorting Embodiments

Some embodiments of the invention can be arranged to generate hotter or cooler flows from a gas. These embodiments can be extremely efficient.

In mathematical terms, let ? W be an amount of work done on molecules in a gas, and let ? V be a mean difference in speed between "hot" and "cold" molecules in hot and cold bulk flows generated by these embodiments. In the more efficient preferred embodiments, ? W/? V can be less than 3.1. Before the invention, a device that achieved this relationship between work and molecular speed had not been realized. Of course, the invention is not limited to embodiments that exhibit this high efficiency.

Figure 10A:
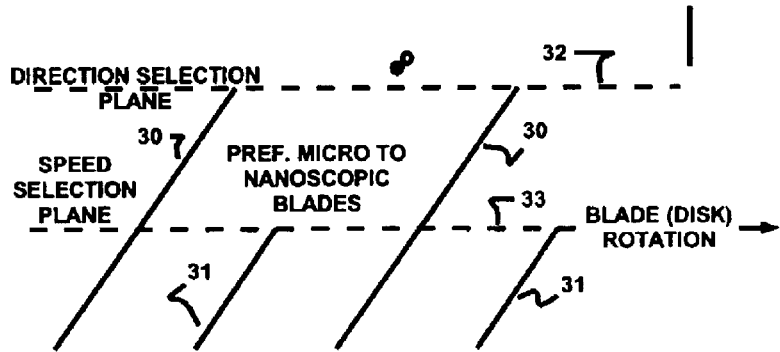
FIGS. 10A to 10C show a heteroscopic turbine that sorts molecules based on speed (temperature).
Figure 10B:
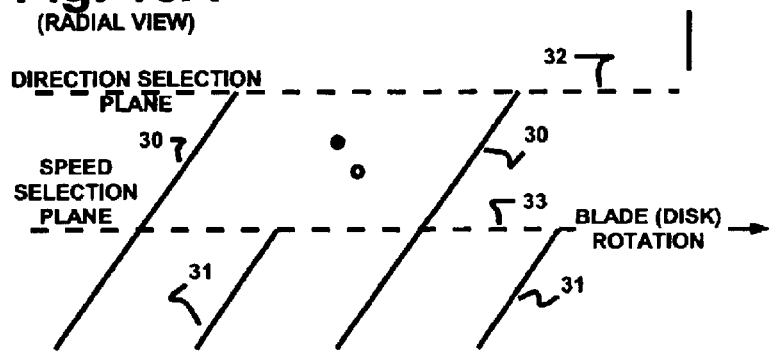
Figure 10C:
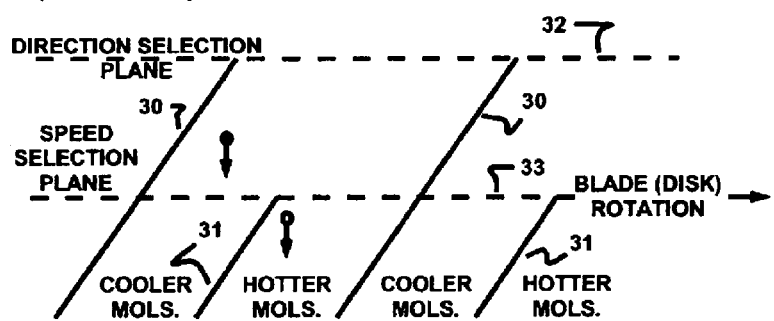

FIGS. 10A to 10C show a heteroscopic turbine that sorts molecules based on speed (temperature). FIGS. 10A to 10C are referred to collectively as FIG. 10.

Briefly, the blades in FIG. 10 have at least two different heights. When the turbine on which the blades are mounted spins, tops of the blades having a first height form a direction selection plane that filters molecules moving toward the disk, and tops of blades having a second height form a speed selection plane that filters molecules based on thermal velocity.

In FIG. 10, turbine blades 30 and 31 preferably are microscopic or even nanoscopic in size. Blades 30 and 31 preferably are mounted on a rotor and are angled in a direction of blade (rotor) rotation. The blades can be mounted on some other structure that moves through a gas. Some of the blades are longer than others. In FIG. 10, blades 30 are longer than blades 31.

If the turbine blades are mounted on a rotor or disk, that rotor or disk preferably rotates fast enough such that the blades are moved through the gas at a speed comparable to the mean thermal velocity of the gas. The spacing between blades preferably is comparable to the mean free path distance of the molecules in the gas. Thus, the arrangement of turbine blades on a particular rotor preferably is matched to a range of molecular speeds and mean free path distances corresponding to a particular range of temperatures and pressures of a gas.

The angle of the turbine blades preferably is chosen based on the mean speed of molecules in the gas, which in turn is dependent upon the temperature and pressure of the gas, and the speed at which the blades move through the gas. In some embodiments, the ambient temperature and pressure of the gas can be controlled to best match the angles of the blades.

The tops of the longer blades form a direction selection plane. Molecules of a gas that cross this plane will be whisked away by the blades. Likewise, the shorter blades form a speed selection plane. Only molecules traveling with a certain vertical speed (and therefore temperature) will be cross this plane in time to be captured by the shorter blades. Stated differently, only molecules moving fast enough to have a sufficiently short time of flight from the direction selection plane to the speed selection plane will be selected by the shorter blades.

FIG. 10 shows direction selection plane 32 and speed selection plane 33. Also shown in FIG. 10 are two molecules represented by small circles. The empty circle represents a hotter and therefore faster (at least in the vertical direction) molecule. The filled circle represents a cooler and therefore slower (at least in the vertical direction) molecule.

In FIG. 10A, neither of the molecules has crossed the direction selection plane. In FIG. 10B, the molecules have traveled sufficiently far downward that they have crossed direction selection plane 32. Of the two molecules, only the hotter molecule has enough downward speed to cross speed selection plane 33 before the closest smaller blade 31 passes by due to motion of the blades (i.e., spinning of the rotor holding the blades). Thus, slower (cooler) molecules and faster (hotter) molecules are segregated as shown in FIG. 10C.

In operation, some faster molecules will be moving in a direction that takes them to the same side of the shorter blade as slower molecules. Thus, the cooler molecules might be "contaminated" with at least some hotter molecules. However, only hotter molecules will have sufficient speed to pass the speed selection plane in time to be grouped on the hotter molecule side. Thus, the mean speed (temperature) of the hotter molecules will tend to be higher than that of the cooler molecules despite any contamination.

Once the molecules have been segregated, like molecules can be aggregated using macroscopic ducts to generate bulk flow. Alternatively, like molecules selected by many blades can simply exit in the same direction, for example below a rotor with the blades, thereby creating a bulk flow without the need for any ducts. In any case, further ducting can be used to aggregate or redirect any flow.

A very large number of blades preferably select molecules for each flow. In a preferred embodiment, on the order to 10^12 or more blades can be used. For example, and without limitation, one preferred embodiment uses 1.75E+13 blades. The invention is not limited to this number of blades.

In terms of "slip," the device in FIG. 10 can be modeled as a perfect or nearly perfect absorber of molecules that cross the direction selection plane. Therefore, no (or few) molecules stick to the blades, ensuring adequate slip between the blades and the gas molecules. Slip not a concern at the output (not shown) of the device due to the bulk nature of the output flow.

The structure of the device shown in FIG. 10 bears a superficial resemblance to a device know as a turbomolecular pump. Turbomolecular pumps use rotating macroscopic turbine blades to select molecules from gas. Molecules that randomly cross the tops of the blades are captured and whisked away. These pumps typically are used to draw molecules from a high vacuum environment in order to create an even "higher" vacuum.

In order for existing turbomolecular pumps to operate, collisions between gas molecules must be avoided. If such collisions occur, the molecules can bounce away from the blades before they can be captured, defeating the operation of the pump.

Typical existing turbomolecular pumps use macroscopic turbine blades rotating at extremely high speeds, for example 75,000 RPM. These high speeds are used so that molecules that cross the path of the rotor blades do not have time to collide with other molecules before being whisked away.

Collisions are also prevented by ensuring that the mean free path distance for the molecules is not too small compared to the container or feed tube for the pump. The ratio between container or feed tube length and mean free path distance is the Knudsen number.

Typical existing turbomolecular pumps only operate effectively if the Knudsen number is no greater than approximately 10. This Knudsen number can only be achieved in a high vacuum, and then with only relatively small containers or feed tubes. Obviously, a significant gas flow cannot be generated by pumping from a high vacuum through a small container or feed tube. As a consequence, existing turbomolecular pumps do not generate significant gas flow.

Furthermore, turbomolecular pumps do not provide any mechanism for segregating molecules from the gas based on their speed or temperature. In fact, the term temperature loses meaning in the vacuum environment in which such pumps operate.

Finally, turbomolecular pumps do not generate a bulk flow at their outputs. Thus, ambient molecules on the output side are free to collide with the output sides of the blades, forcing them to do significant work.

Thus, the device shown in FIG. 10 is very different from turbomolecular pumps. The device differs from such pumps in its scale of features, operating principles, operating conditions, generated flow, and work characteristics.

Figure 11A:
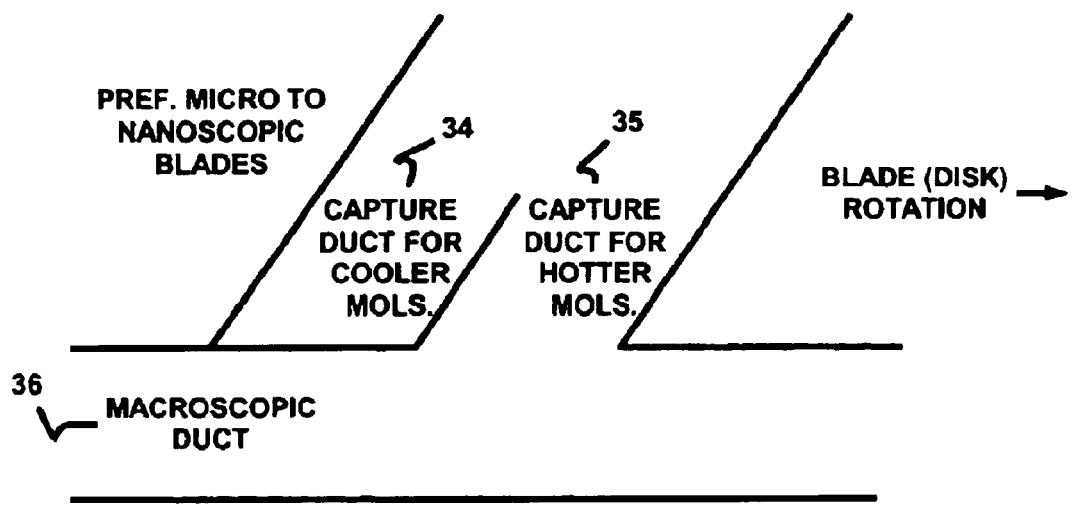
FIGS. 11A and 11B show some possible variations on the arrangement shown in FIG. 10.
Figure 11B:
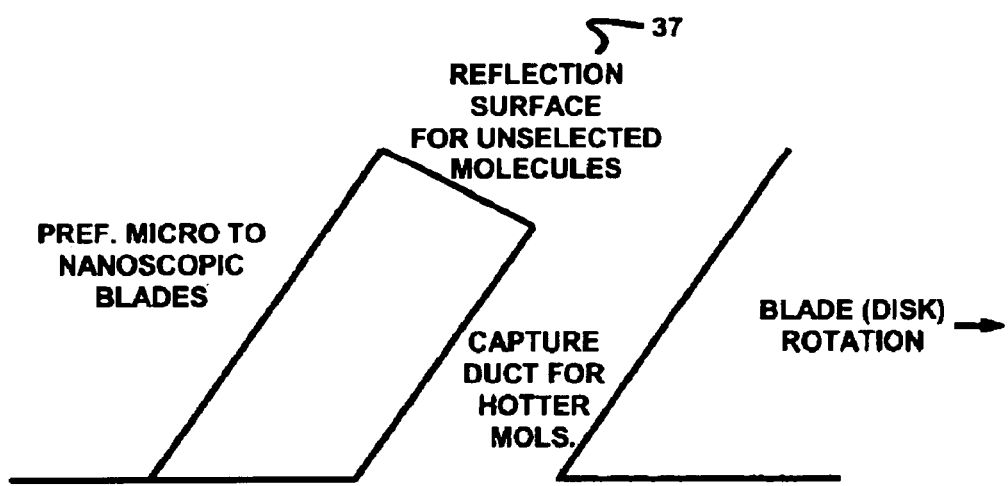

FIGS. 11A and 11B show some possible variations on the arrangement shown in FIG. 10. FIGS. 11A and 11B are referred to collectively as FIG. 11.

FIG. 11A shows capture duct 34 for cooler molecules, and capture duct 35 for hotter molecules. Capture duct 35 in turn feeds macroscopic duct 36 for aggregating and transporting the hotter molecules away. Transportation of the cooler molecules is not illustrated in FIG. 11A.

In some cases, only hotter or cooler bulk flows are desired. In this case, a reflection surface can be added to the device to block undesired molecules. Reflection surface 37 adjoining the trailing turbine blade in FIG. 11B is such a surface. In the embodiment shown in FIG. 11B, no ducting is used to aggregate the selected molecules. Rather, the hotter molecules selected by many blades aggregate below the rotor or other element on which the blades are mounted. Of course, ducting can be used if so desired.

Figure 12:
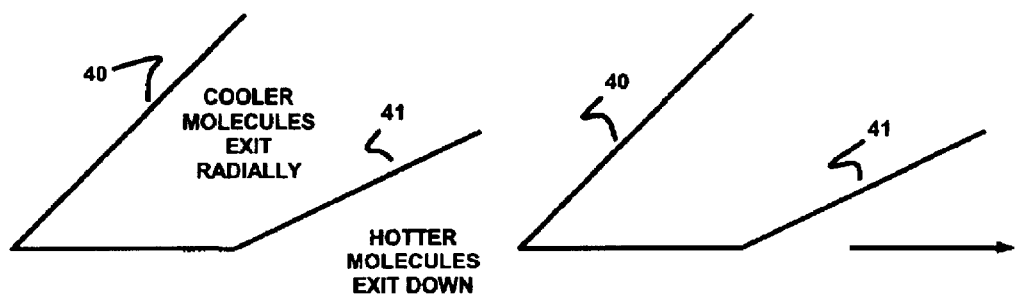
FIGS. 12 to 14 show more possible arrangements of blades for a heteroscopic turbine that performs speed sorting of molecules in a gas.
Figure 13:
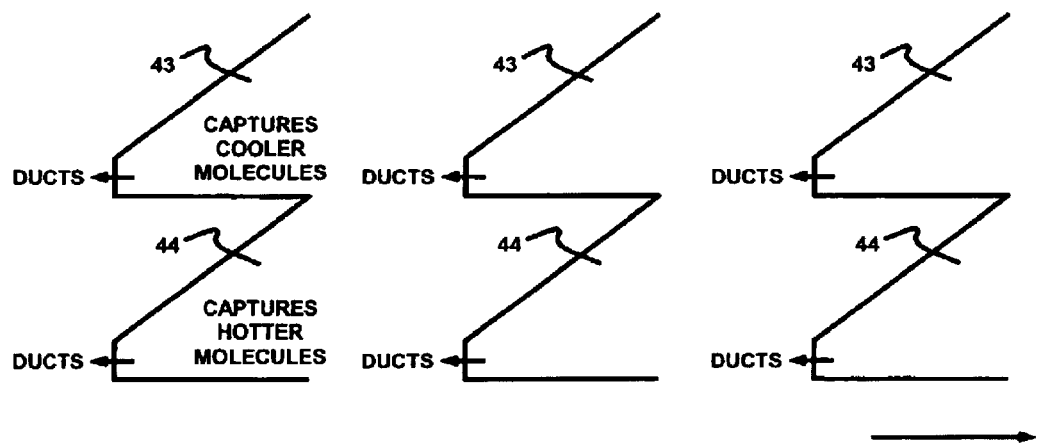
Figure 14:
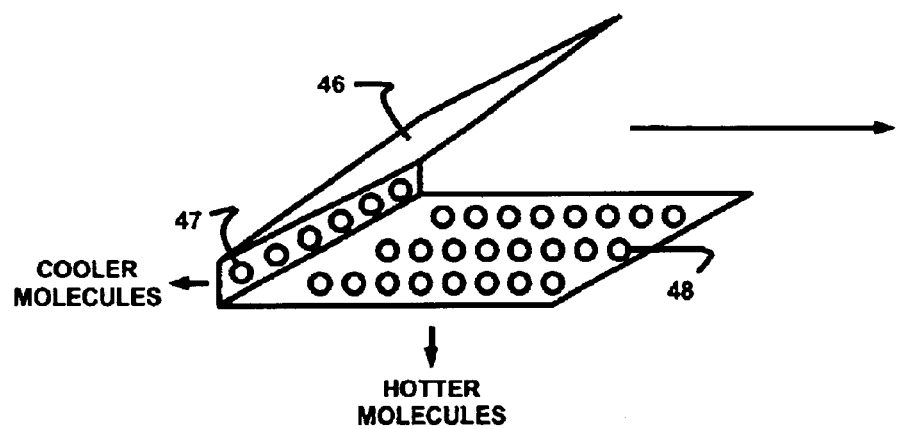

FIGS. 12 to 14 show more possible arrangements of blades for a heteroscopic turbine that performs speed sorting of molecules in a gas.

FIG. 12 shows blades formed from angles planes. Hotter molecules pass the direction selection plane formed by the tops of taller blades 40 and pass through the blades before being blocked off by shorter blades 41. Thus, hotter molecules can exit below the blades. Cooler molecules can be directed by a channel formed between each blade 40 and each blade 41 for exit radially from the blades.

FIG. 13 shows blades formed from angled planes with bases. The blades are stacked in layers. Blades 43 on a top layer preferentially capture cooler molecules. Blades 44 on a bottom layer preferentially capture hotter molecules. Ducting can be provided to transport the molecules away, for example for aggregation into bulk flows.

FIG. 14 shows blade 46 formed from an angled planes projecting from a surface, akin to the blade shown in FIG. 6. This blade has openings 47 for cooler molecules to pass at angles formed between the planes and the surface, and openings 48 for hotter molecules to pass through the surface.

Other blade arrangements can be used with a heteroscopic turbine according to the invention to perform speed sorting of molecules in gas.

Figure 15:
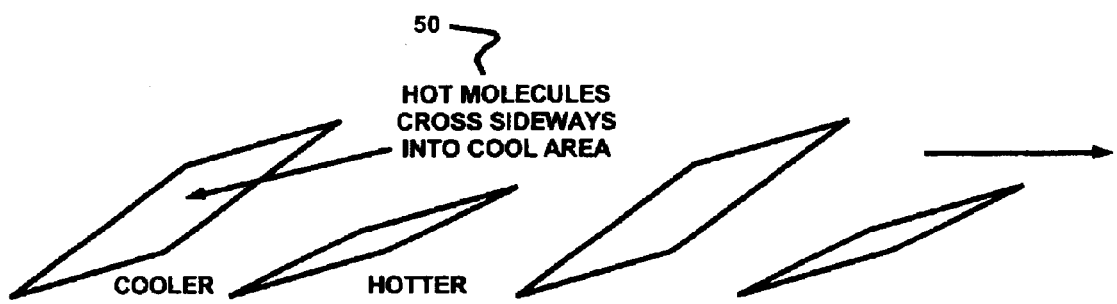
FIG. 15 shows a potential problem caused by hotter molecules moving laterally across blades in a heteroscopic turbine.
Figure 16:
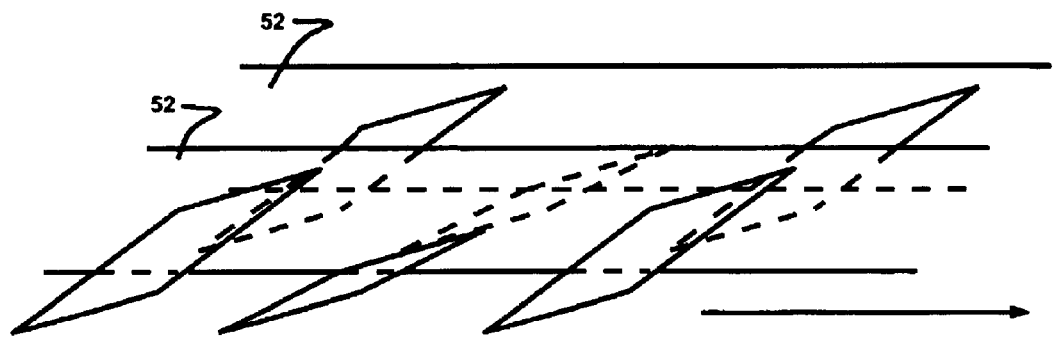
FIGS. 16 to 18 show possible solutions to the problem shown in FIG. 15.
Figure 17:
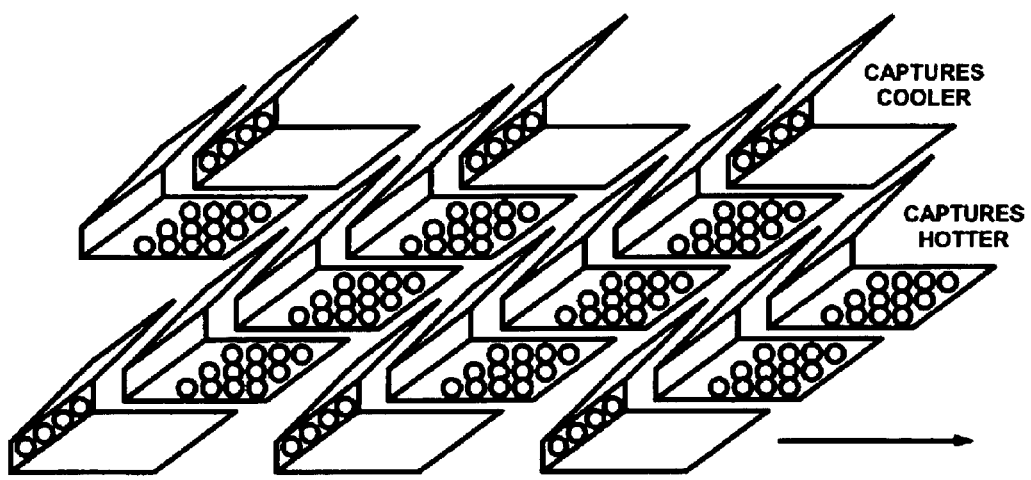
Figure 18:

FIG. 15 shows a potential problem caused by hotter molecules moving laterally across blades in a heteroscopic turbine. In FIG. 15, hotter molecule 50 that moves laterally across the blades passes into an area that is supposed to sort out cooler molecules. FIGS. 16 to 18 show possible solutions to this problem.

In FIG. 16, baffles 52 between rows of blades help prevent lateral motion of hotter molecules into cooler molecule areas.

In FIG. 17, three rows of blades that capture hotter molecules are surrounded by rows of blades that capture cooler molecules. Thus, any laterally moving molecules will tend to be captured by the blades for hotter molecules.

To combine the arrangements in FIGS. 16 and 17, baffles could be placed between sets of rows of blades such as those shown in FIG. 17. In other words, every five (or some other number) of rows of blades could be separated by baffles.

Yet another solution is to curve the blades concavely in a direction of their motion through a gas. This solution is illustrated in FIG. 18, which shows curved blades 53. The curved sides of the blades would tend to reflect laterally moving molecules, as illustrated by the angled arrow in the figure.

Other solutions and arrangements are possible without departing from the invention.

Figure 19:
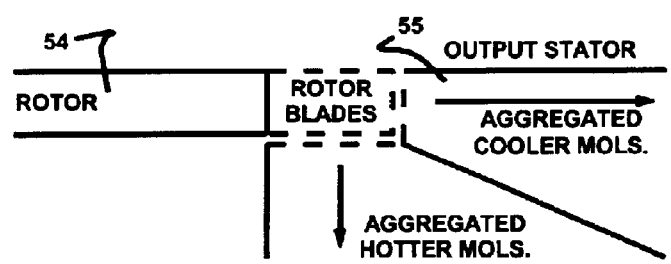
FIG. 19 shows a possible aggregation and ducting arrangement for a heteroscopic turbine.

FIG. 19 shows a possible aggregation and ducting arrangement for a heteroscopic turbine.

In FIG. 19, molecules are segregated by blades on rotor 54. Ducting or other structures redirect the molecules based on their speed (i.e., temperature). Output stator 55 includes preferably macroscopic ducting to aggregate and to transport faster (i.e., hotter) molecules below rotor 54. Output stator 55 also includes preferably macroscopic ducting to aggregate and to transport slower (i.e., cooler) molecules radially from rotor 54.

Figure 20:
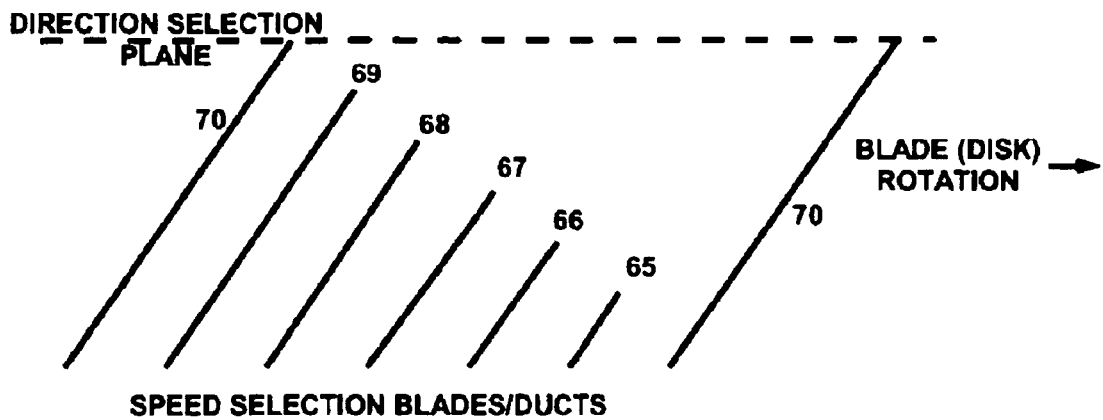
FIGS. 20 and 21 show possible modifications for blade arrangements for a heteroscopic turbine.
Figure 21:
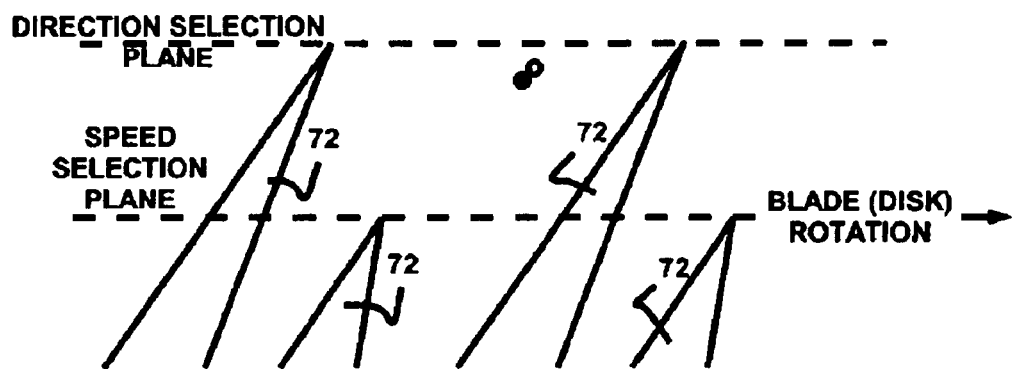

FIGS. 20 and 21 show possible modifications for blade arrangements for a heteroscopic turbine.

In the foregoing speed sorting embodiments, molecules are segregated into two groups: hotter and cooler. However, molecules can be segregated into plural different groups based on their velocities. To this end, FIG. 20 shows plural blades 65 to 69 of different heights disposed between blades 70 that define a direction selection plane. When these blades move, for example by rotation of a rotor on which they are mounted, the blades will select plural different speeds of molecules. Only the fastest molecules will reach the leading shorter blade 65. The slowest will reach the trailing longer blades, possibly contaminated with faster molecules. When the molecules are aggregated, those caught by leading shorter blades will tend to be faster and therefore hotter than those caught by trailing longer blades.

Again, the angle of these blades preferably is chosen based on the mean speed of molecules in the gas, which in turn is dependent upon the temperature and pressure of the gas. In some embodiments, the ambient temperature and pressure of the gas can be controlled to best match the angles of the blades.

One problem that can arise with the heteroscopic devices is backflow from inside the device out of the input ports or past the turbine blades. One solution to this problem is to arrange the input ports and turbine blades to reduce outflow. In FIG. 21, blades 72 are thickened at their bases to create funnel-shaped channels that help prevent outflow.

Rotor/Stator Based Speed Sorting Embodiments

FIGS. 22A to 22D illustrate a two stator and one rotor heteroscopic turbine that can generate hotter flows, cooler flows, or both from a gas. FIGS. 22A to 22D are referred to collectively as FIG. 22.

FIG. 22 shows a device that generates a hotter flow, cooler flow, or both hotter and cooler flows from a gas. The device includes structures that segregate molecules in the gas on the basis of the speed of those molecules, and structures that aggregate at least some of the segregated molecules into a bulk flow. The device is heteroscopic in that at least some of the structures that segregate the molecules are microscopic or smaller, while the segregated molecules are aggregated into a macroscopic bulk flow.

In FIG. 22, the structures that segregate the molecules include input stator 81, rotor 82, and output stator 83. The stators preferably are disks that are positioned coaxially with the rotor.

In a preferred embodiment, rotor 82 flies over at least one of the stators due to Eckman airflow, similar to how a disk head flies over a disk in a computer disk drive. Alternatively, magnetic repulsion from one or both of the stators can be used to keep the rotor in place. Normal mechanical mounting and other techniques also can be used.

The input stator includes plural microscopic or smaller input ports, one of which is shown as port 84. The small size of the ports permits selection of molecules moving only in a limited set of directions. Preferably, a very large number of input ports are arranged on the device.

Rotor 82 preferably is, is mounted on, or is part of a rotating structure such as the rotors in FIGS. 1 and 2. FIG. 22 shows the rotor in cross section. The arrow to the right of rotor 82 shows the direction of movement of the rotor as the structure rotates.

Rotor 82 includes plural channels for molecules that enter the input ports. Channel 85 is such a channel. The rotor channels can be larger than the input ports. Preferably, though, the channels are microscopic size or smaller.

This disk or rotor preferably rotates fast enough such that the input ports are moved through the gas at a speed comparable to the mean thermal velocity of the gas. The size of the input ports preferably is comparable to the mean free path distance of the molecules in the gas. Thus, the arrangement of a particular rotor preferably is matched to a range of molecular speeds and mean free path distances corresponding to a particular range of temperatures and pressures of a gas.

The output stator includes at least one barrier arranged such that hotter molecules pass through the channels to one side of the barrier and cooler molecules pass through the channels to an other side of the barrier. One of these barriers is shown as barrier 86. Representative hotter molecules are shown with small empty circles, and representative cooler molecules are shown by small filled circles.

In the device shown in FIG. 22, one or more macroscopic ducts aggregate the hotter molecules, the cooler molecules, or both the hotter and the cooler molecules into separate bulk flows. Macroscopic duct 87 represents one of these ducts.

Each subfigure in FIG. 22 illustrates different steps in segregating and aggregating gas molecules according to this embodiment of the invention.

Figure 22A:
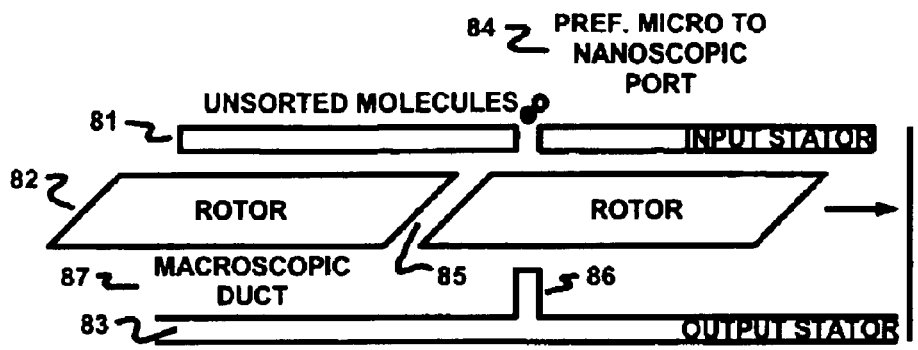
FIGS. 22A to 22D illustrate an embodiment of a heteroscopic turbine that includes a rotor (disk) arranged between two stators.

In FIG. 22A, unsorted molecules are present above input stator 81. These molecules are undergoing normal thermal motion, which is random motion in all directions.

Figure 22B:
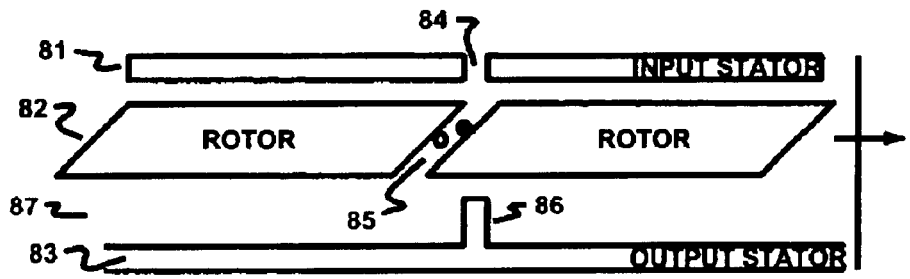
Figure 22C:
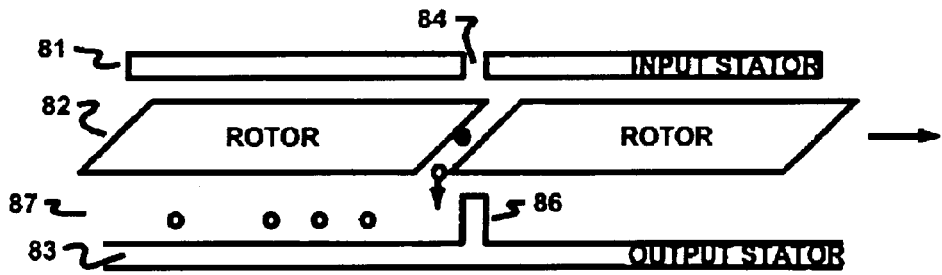

Molecules possessing downward speed pass through port 84 of input stator 81 in FIG. 22B. These molecules can then enter channel 85 of rotor 82.

Depending on the molecules' velocities in the downward direction (i.e., the direction of the axis of rotor 82), the molecules take different amounts of time to pass through the channels in the rotor. Hotter molecules tend to have higher downward velocities, so the hotter molecules tend to pass through the channels faster. Cooler molecules tend to have lower downward velocities, so the cooler molecules tend to pass through the channel slower.

Figure 22D:
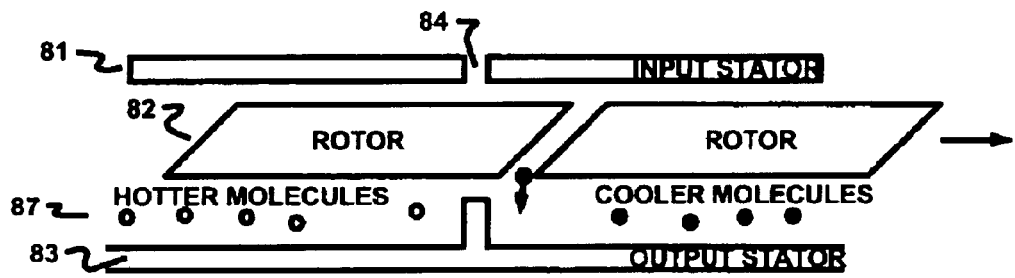

Barrier 86 is positioned so that hotter molecules that exit the channel faster pass to one side of the barrier, while cooler molecules that exit the channel slower pass to another side of the barrier. Thus, as shown in FIG. 22D, hotter (faster) molecules exit to one side of barrier, and cooler (slower) molecules exit to the other side of barrier. Macroscopic ducts 87 aggregate like molecules, preferably from a very large number of channels, and transport those molecules to one or more output ports (not shown). As a result, bulk flows with different temperatures are generated.

One concept useful for understanding the operation of the device shown in FIG. 22 is "slip." Slip is relative motion between a spinning rotor and gas molecules in contact with the rotor. In some systems, no slip occurs because gas molecules in contact with the rotor tend to stick to the rotor. However, in FIG. 22, input stator 81 prevents the gas molecules from sticking to rotor 82. As a result, slip occurs, and the molecules can pass into the channels of the rotor.

At the output (not shown) of the device in FIG. 22, the macroscopic ducts preferably generate a bulk flow of gas molecules. Because of this bulk flow, slip considerations are less important at the output.

The device shown in FIG. 22 segregates molecules primarily on the basis of their downward (i.e., vertical) velocities. However, gas molecules also might have horizontal (e.g., along the rotor radius) velocities, even after passing through channels in the rotor. The output stator can include extra barriers to segregate and aggregate molecules based on their radial velocities.

Figure 23:
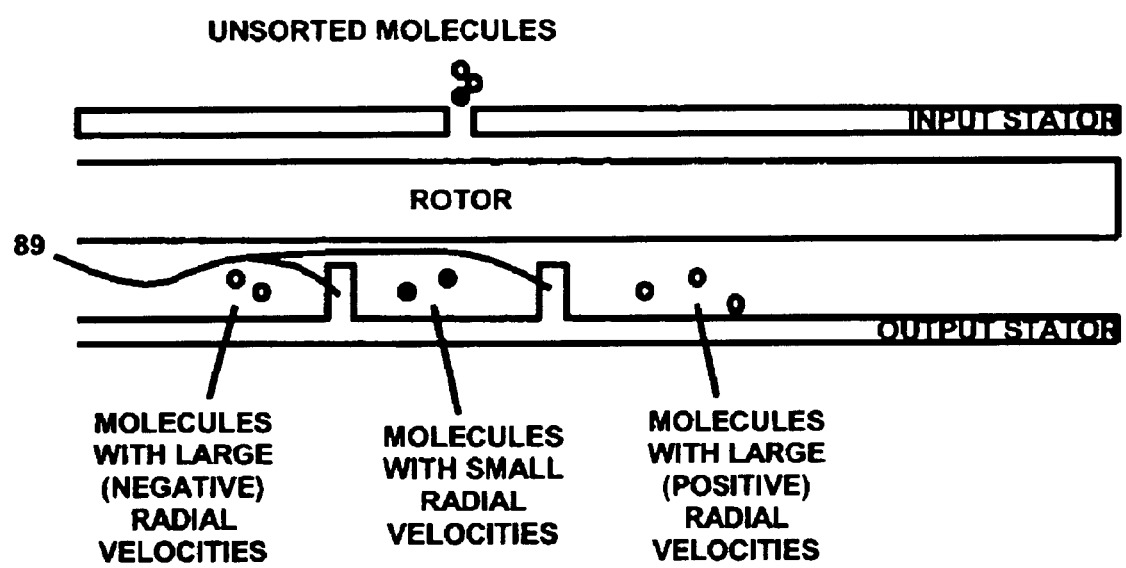
FIG. 23 shows a possible variation of the heteroscopic turbine shown in FIG. 22.

Thus, FIG. 23 shows an arrangement wherein the output stator includes barriers 89 arranged in pairs. Each pair is arranged such that hotter molecules pass through the rotor to outside of the pair of barriers and cooler molecules pass through the rotor to between the pair of barriers.

In more detail, slower and therefore cooler molecules with smaller radial velocities tend not to travel far in the radial direction. These molecules aggregate between barriers 89 of the output stator.

Faster and therefore hotter molecules with larger radial velocities can travel beyond barriers 89. Thus, these molecules aggregate on either side of the barriers.

Macroscopic ducting can be used to redirect the cooler and hotter aggregated molecules to desired output ports (not shown).

Figure 24A:
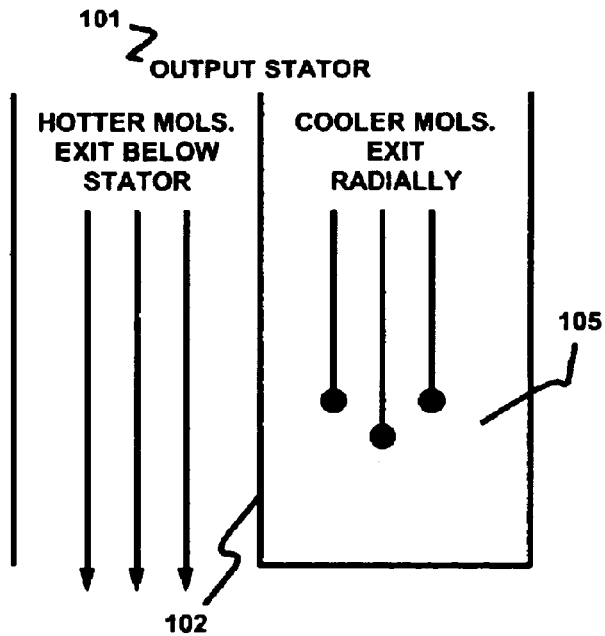
FIGS. 24A to 24C show possible features for an output stator for a heteroscopic turbine.
Figure 24B:
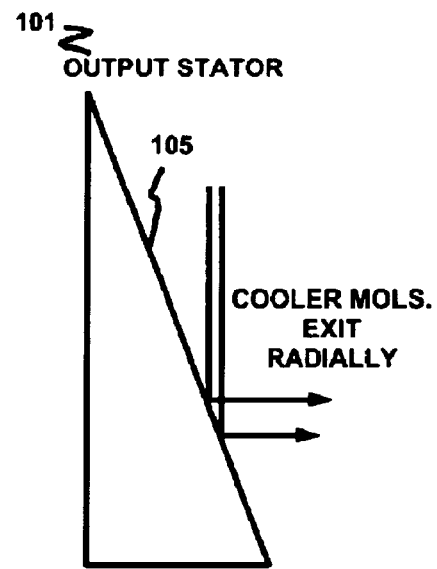
Figure 24C:
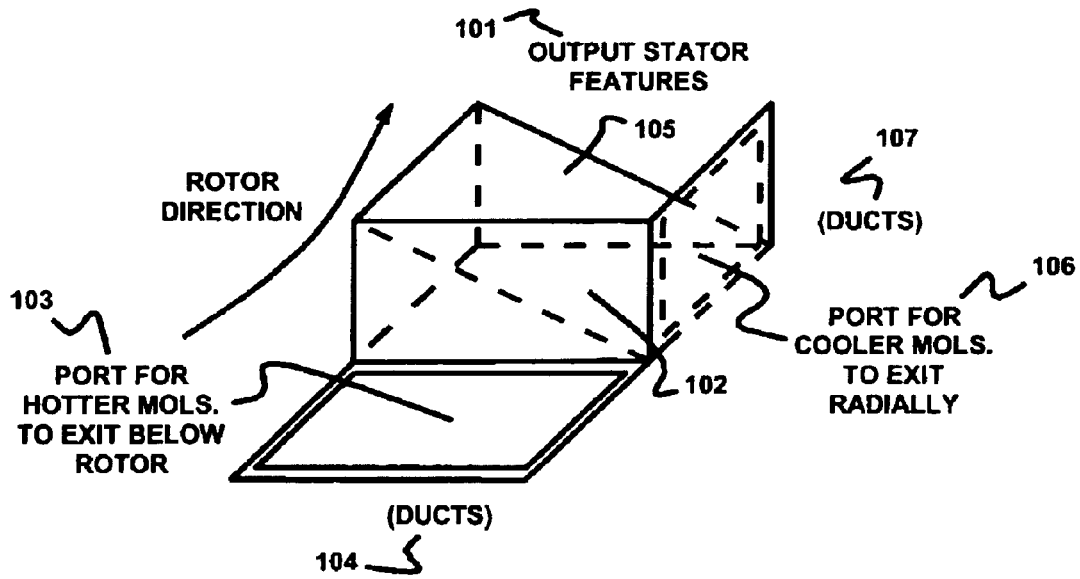

FIGS. 24A to 24C show possible features for an output stator for a heteroscopic turbine. FIGS. 24A to 24C are referred to collectively as FIG. 24.

In FIG. 24, stator 101 is an output stator akin to output stator 83 in FIG. 22. Likewise, barrier 102 is a barrier akin to barrier 86 shown in FIG. 22. Thus, faster (i.e., hotter) molecules pass to the left of barrier 102, and slower molecules pass to the right of barrier 102.

The faster molecules pass through downward directed port 103 for aggregation and output below stator 101, as shown in FIG. 24C. In one embodiment, the molecules are aggregated simply by passing out of many ports such as port 103. In another embodiment, macroscopic ducts 104 situated in or below the stator can aggregate the molecules from plural such ports.

Slower (i.e., cooler) molecules are redirected by angled surface 105 into a radial direction, as shown in FIG. 24B. The impact with the angled surface also can slow the molecules, possibly cooling them further. The redirected slower molecules pass through radially directed port 106 for aggregation and output radially from stator 101, as shown in FIG. 24C. In one embodiment, the molecules are aggregated simply by passing out of many ports such as port 106. In another embodiment, macroscopic ducts 107 situated in or beside the stator can aggregate the molecules from plural such ports.

In a preferred embodiment, output stator 101 includes macroscopic ducting to transport aggregated cooler molecules into bulk flows radially away from the device. Likewise, output stator 101 preferably includes macroscopic ducting to transport aggregated hotter molecules into bulk flows downward from the device.

The arrangement shown in FIGS. 24A to 24C can be modified so that cooler molecules exit downward, while hotter molecules exit radially. For example, the angled surface could be placed on the left in FIG. 24A.

Figure 25:
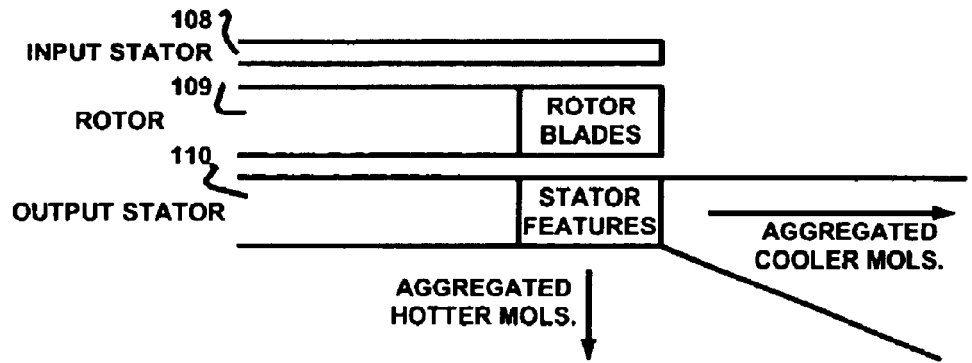
FIG. 25 shows a possible aggregation and ducting arrangement for the rotor/stator version of the heteroscopic turbine.

FIG. 25 shows a possible aggregation and ducting arrangement for the rotor/stator version of the heteroscopic turbine.

In FIG. 25, molecules enter input stator 108 (akin to input stator 81 in FIG. 22), pass through rotor 109 (akin to rotor 82 in FIG. 22), and are segregated and aggregated by output stator 110 using structures such as those shown in FIG. 24. Other different structures can be use without departing from the invention.

Figure 26:
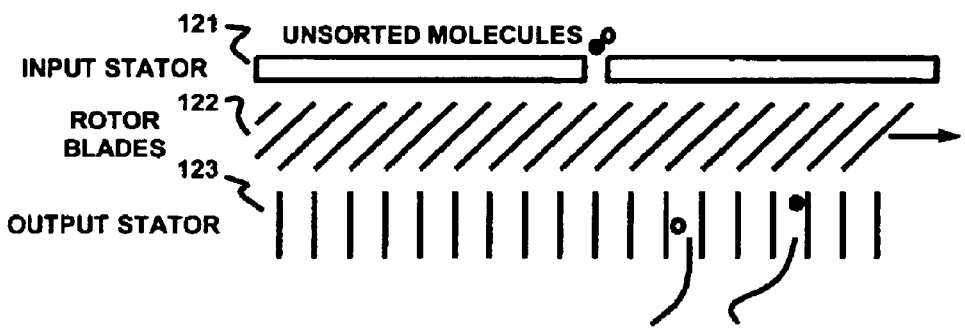
FIGS. 26 to 28 show possible variations of the rotor/stator version of the heteroscopic turbine.
Figure 27:
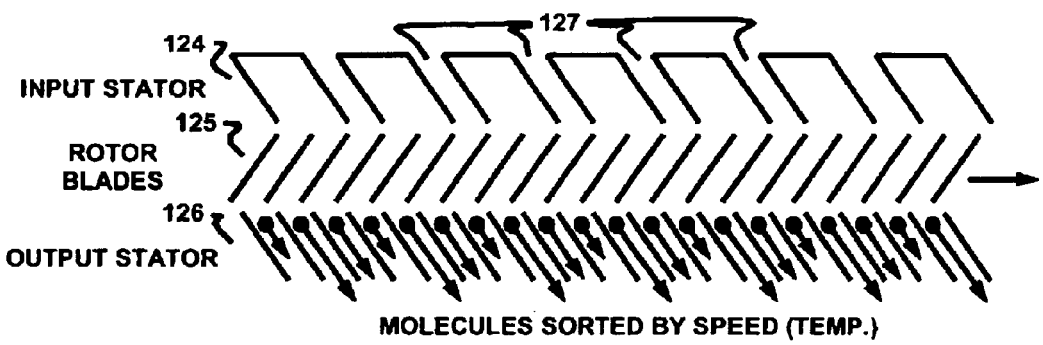
Figure 28:
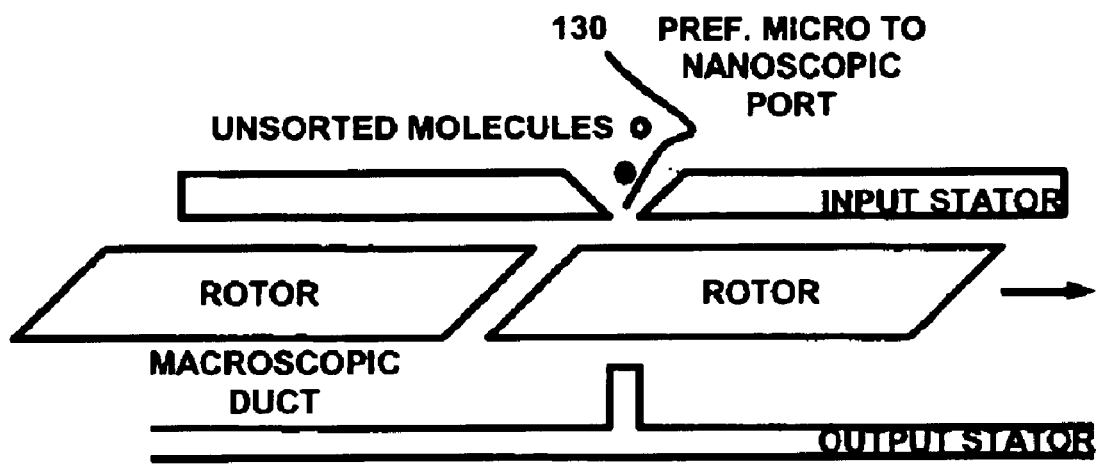

FIGS. 26 to 28 show possible variations of the rotor/stator version of the heteroscopic turbine.

In the embodiments shown in FIGS. 22 to 25, molecules are segregated into two groups: hotter and cooler. However, molecules can be segregated into plural different groups based on their velocities. Thus, FIG. 26 shows input stator 121, rotor 122, and output stator 123 configured to generate plural different flows.

Input stator 121 is akin to the input stators already discussed. Rotor 122 can also be of the same type as those discussed above. However, FIG. 26 shows an alternative construction, in which the rotor includes plural blades spaced apart to form channels. The angle of these blades preferably is chosen based on the mean speed of molecules in the gas, which in turn is dependent upon the temperature and pressure of the gas, and the speed at which the blades move through the gas. In some embodiments, the ambient temperature and pressure of the gas can be controlled to best match the angles of the blades.

Output stator 123 includes plural different output paths. Faster molecules reach one of these paths after less travel distance for the rotor blades, while slower molecules reach one of the paths after more travel distance for the rotor blades. In FIG. 26, the rotor is moving from left to right (indicated by the arrow). Thus, faster (hotter) molecules exit more leftward output paths in stator 123, and slower (cooler) molecules exit more rightward output paths in stator 123. The arrangement of paths preferably is periodic, repeating relative to each input port for input stator 121.

FIG. 27 is arranged in a somewhat similar manner as FIG. 26, except that input stator 124 includes plural input ports. Rotor 125 again is constructed from blades that form channels, and output stator 126 includes plural output paths. Relative speeds of molecules output by the paths are represented by arrows, with longer arrows representing faster molecules.

Another feature shown in FIG. 27 is that input stator 124 has longer angled parallel input ports 127. Preferably, these ports are angled in the direction of rotor movement and have a length on the order of the mean free path distance for the gas being processed. This arrangement restricts input molecules to those already moving in the direction of the rotor, which improves the degree of segregation of molecules by the device. Restriction of the input molecules in this fashion is referred to as "collimation."

One problem that can arise with the heteroscopic devices is backflow from inside the device out of the input ports or past the turbine blades. One solution to this problem is to arrange the input ports and turbine blades to reduce outflow. For example, in FIG. 28, input port 130 is funnel shaped to help prevent outflow.

Interchangeability of Features

Each of the embodiments discussed herein can benefit from structures and arrangements described for the other embodiments.

Alternative Embodiments

Many of the foregoing embodiments are discussed in the context of rotational motion. Application of many of these concepts to linear motion through a gas would not require any further invention. For instance, the turbine blades could be mounted on an element that moves linearly through the air. An example of such an element would be a radiator of a vehicle.

Throughout this application, the rotor was assumed to be oriented with a vertical axis for ease of discussion. However, the invention is equally applicable to any other orientation. If another orientation is used, terms such as "downward," "below," "vertical," etc. should be read as being re-oriented in accordance with that orientation.

Furthermore, although preferred embodiments of the invention are disclosed herein, many variations are possible which remain within the content, scope and spirit of the invention, and these variations would become clear to those skilled in the art after perusal of this application.

What is claimed is:

1. A heteroscopic turbine that generates a flow from a gas, molecules in said gas characterized by a mean free path distance, comprising:
    a moving surface; and
    a plurality of turbine blades on or in said surface, each of said blades having a height comparable to said mean free path distance, said blades spaced apart by a distance comparable to said mean free path distance.

2. A heteroscopic turbine as in claim 1, wherein in operation said surface moves such that said turbine blades pass through said gas at a speed comparable to a mean thermal velocity of molecules in said gas.

3. A heteroscopic turbine as in claim 2, wherein said blades are arranged on chips that are attached in or on said disk.

4. A heteroscopic turbine as in claim 3, wherein said blades are attached directly in or on said disk.

5. A heteroscopic turbine as in claim 2, wherein when said turbine spins, tops of said blades form a direction selection plane that filters molecules moving toward said disk and generates a flow from said molecules.

6. A heteroscopic turbine as in claim 5, wherein said flow creates forced convection in a direction of said flow, thereby transferring heat in a direction of said flow.

7. A heteroscopic turbine as in claim 2, wherein said blades are formed by edges of holes in said surface.

8. A heteroscopic turbine as in claim 2, wherein said blades are angled planes projecting from said surface with openings for molecules to pass at angles formed between said planes and said surface.

9. A heteroscopic turbine as in claim 8, further comprising ducting to transport molecules that have been selected by said blades.

10. A heteroscopic turbine as in claim 2, wherein said blades have at least two different heights, and
    wherein when said turbine spins, tops of said blades having a first height form a direction selection plane that filters molecules moving toward said disk, and tops of blades having a second height form a speed selection plane that filters molecules based on mean thermal velocity;
    whereby hotter and cooler molecules are sorted.

11. A heteroscopic turbine as in claim 10, further comprising ducting to transport said hotter molecules, said cooler molecules, or both said hotter and said cooler molecules.

12. A heteroscopic turbine as in claim 10, further comprising surfaces that reflect said hotter molecules or said cooler molecules away from said surface.

13. A heteroscopic turbine as in claim 10, further comprising baffles between rows of said blades.

14. A heteroscopic turbine as in claim 10, wherein said blades are curved concavely in a direction of motion through said gas.

15. A heteroscopic turbine as in claim 2, wherein said blades are stacked in layers, a top one of said layers preferentially capturing cooler molecules, and a bottom one of said layers preferentially capturing hotter molecules;
    whereby hotter and cooler molecules are sorted.

16. A heteroscopic turbine as in claim 15, further comprising ducting to transport said hotter molecules, said cooler molecules, or both said hotter and said cooler molecules.

17. A heteroscopic turbine as in claim 15, further comprising baffles between rows of said blades.

18. A heteroscopic turbine as in claim 15, wherein said blades are curved concavely in a direction of motion through said gas.

19. A heteroscopic turbine as in claim 2, wherein said blades are angled planes projecting from said surface, with openings for cooler molecules to pass at angles formed between said planes and said surface, and with opening for hotter molecules to pass through said surface;
    whereby hotter and cooler molecules are sorted.

20. A heteroscopic turbine as in claim 19, further comprising ducting to transport said hotter molecules, said cooler molecules, or both said hotter and said cooler molecules.

21. A heteroscopic turbine as in claim 19, further comprising baffles between rows of said blades.

22. A heteroscopic turbine as in claim 19, wherein said blades are curved concavely in a direction of motion through said gas.

23. A heteroscopic turbine as in claim 2, wherein said blades are thicker at their bases.

24. A heteroscopic turbine as in claim 2, wherein said moving surface is a rotor that rotates between two stators.

25. A heteroscopic turbine as in claim 24, wherein one of the two stators includes barriers positioned such that hotter molecules pass through said rotor to one side of said barrier and cooler molecules pass through said rotor to another side of said barrier;
    whereby hotter and cooler molecules are sorted.

26. A heteroscopic turbine as in claim 24, wherein one of the two stators includes barriers arranged in pairs, each pair arranged such that hotter molecules pass through said rotor to outside of said pair of barriers and cooler molecules pass through said rotor to between said pair of barriers;
    whereby hotter and cooler molecules are sorted.

27. A heteroscopic turbine as in claim 24, wherein the rotor flies over at least one of the stators due to Eckman airflow, magnetic levitation, or both.

28. A heteroscopic turbine as in claim 24, further comprising ducting to transport molecules that have passed through said rotor.

29. A heteroscopic turbine as in claim 24, wherein said rotor includes angled surfaces for redirecting hotter molecules or cooler molecules radially.

30. A heteroscopic turbine as in claim 24, wherein input ports in one of the two stators are funnel shaped.

* * * * *